E. L. ALLEN.
NUT LOCK.
APPLICATION FILED JUNE 1, 1915.

1,178,373.

Patented Apr. 4, 1916.

Witnesses

Inventor
E. L. Allen

UNITED STATES PATENT OFFICE.

ERNEST L. ALLEN, OF ECKMAN, NORTH DAKOTA, ASSIGNOR OF ONE-FOURTH TO MATH BAUERS, OF ELROSA, MINNESOTA.

NUT-LOCK.

1,178,373.  Specification of Letters Patent.  Patented Apr. 4, 1916.

Application filed June 1, 1915. Serial No. 31,557.

*To all whom it may concern:*

Be it known that I, ERNEST L. ALLEN, a citizen of the United States, residing at Eckman, in the county of Bottineau and State of North Dakota, have invented certain new and useful Improvements in Nut-Locks; and I do hereby declare the following to be a full, clear, and exact description of the invention, such as will enable others skilled in the art to which it appertains to make and use the same.

This invention relates to improvements in nut locks, the object of the invention being to effect improvements in the construction of a bolt and to combine therewith nuts of improved construction which when screwed on the bolt are effectually locked thereto and prevented from becoming casually loosened thereon.

The invention consists in the construction, combination and arrangement of devices hereinafter described and claimed.

Figure 1:
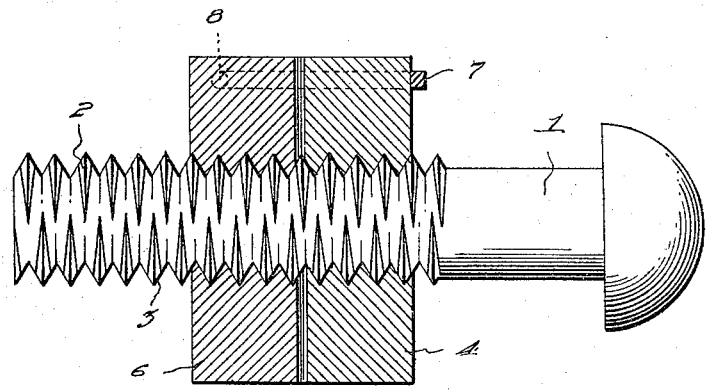
Figure 2:
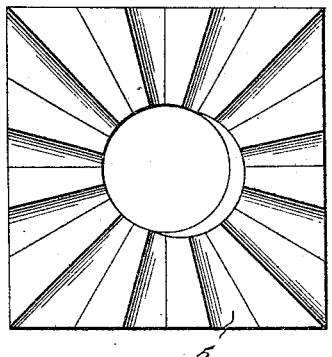
Figure 3:
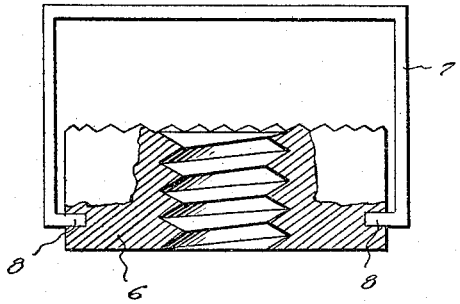
Figure 4:
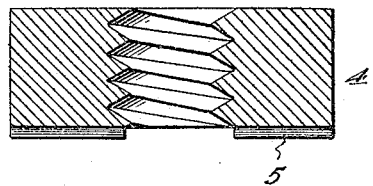

In the accompanying drawings: Figure 1 is an elevation of a bolt and a sectional view of locking nuts arranged on the bolt and constructed in accordance with my invention. Fig. 2 is a detail plan showing the inner side of one of the nuts. Fig. 3 is a detail sectional view of one of the nuts. Fig. 4 is a similar view of the other nut.

The stem of the bolt 1 is provided with both right and left hand intersecting screw threads 2—3. I also provide a left hand threaded nut 4 which is adapted to be screwed on the left hand threads of the bolt and the outer side of which is provided with radial hand grooves 5. A nut 6 is also provided, the bore of which is right hand threaded and is adapted to engage the right hand threads of the bolt and to be screwed thereon and to bear against the nut 4. The radial grooves 5 of the nut 4 secure the nuts together and this is also accomplished by reason of the right hand and left hand threads. Hence the nuts cannot become casually detached or loosened. To further secure the nuts together I provide the nut 6 with a bail 7 which is pivotally connected thereto as at 8 and which is adapted to be engaged with the nut 4 as shown in Fig. 1.

Having thus described my invention, I claim:—

In combination with a bolt having intersecting right and left hand threads, a pair of nuts respectively provided with right and left hand threaded bores, and a bail pivotally secured to two of the opposed side faces and intermediate the bore and another of the side faces of the outermost nut and adapted to be swung downward and embrace two opposed sides and the outer face of the inner nut whereby said nuts are prevented from being rotated.

In testimony whereof I affix my signature in presence of two witnesses.

ERNEST L. ALLEN.

Witnesses:
GEO. T. HAMERY,
J. H. ENGH.

Copies of this patent may be obtained for five cents each, by addressing the "Commissioner of Patents. Washington, D. C."